(12) United States Patent
Tian (10) Patent No.: US 10,657,272 B2
(45) Date of Patent: May 19, 2020

(54) SECURELY AND EFFICIENTLY SHARING DATA EXCHANGE RECORDS

(71) Applicant: Alibaba Group Holding Limited, George Town (KY)

(72) Inventor: Ye Tian, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 225 days.

(21) Appl. No.: 15/822,381

(22) Filed: Nov. 27, 2017

(65) Prior Publication Data

US 2018/0075246 A1 Mar. 15, 2018

Related U.S. Application Data

(63) Continuation of application No. PCT/CN2016/080439, filed on Apr. 28, 2016.

(30) Foreign Application Priority Data

May 28, 2015 (CN) .......................... 2015 1 0284669

(51) Int. Cl.
*H04L 29/06* (2006.01)
*G06F 21/62* (2013.01)
(Continued)

(52) U.S. Cl.
CPC .............. *G06F 21/62* (2013.01); *G06F 16/00* (2019.01); *G06F 16/955* (2019.01);
(Continued)

(58) Field of Classification Search
CPC .... G06F 21/62; G06F 21/606; G06F 21/6227; G06F 16/955; G06F 16/00
See application file for complete search history.

(56) References Cited

U.S. PATENT DOCUMENTS 7,242,772 B1    7/2007 Tehranchi
7,730,030 B1 *  6/2010 Xu .......................... G06Q 10/10
                                                         707/617
(Continued)

FOREIGN PATENT DOCUMENTS

CN    1664834      9/2005
CN    102779312    11/2012
(Continued)

OTHER PUBLICATIONS

Search Report and Written Opinion of the Intellectual Property Office of Singapore issued in Singapore Application No. 11201709497W dated Aug. 1, 2018; 11 pages.
(Continued)

*Primary Examiner* — Hosuk Song
(74) *Attorney, Agent, or Firm* — Fish & Richardson P.C.

(57) ABSTRACT

A data exchange is stored between two parties as one or more data exchange records. A data exchange record locator for locating the one or more data exchange records is generated. The data exchange record locator is sent to at least one of the two parties. A request is received for at least one of the one or more data exchange records from a non-party not participating in the data exchange. The at least one of the one or more data exchange records is sent to the non-party.

17 Claims, 2 Drawing Sheets

(51) Int. Cl.
*G06F 16/955* (2019.01)
*G06F 16/00* (2019.01)
*G06F 21/60* (2013.01)
*G06K 19/06* (2006.01)

(52) U.S. Cl.
CPC ........ *G06F 21/606* (2013.01); *G06F 21/6227* (2013.01); *G06K 19/06037* (2013.01)

(56) References Cited

U.S. PATENT DOCUMENTS

| | | | |
|---|---|---|---|
| 7,971,234 | B1 | 6/2011 | Sussland et al. |
| 8,364,948 | B2 * | 1/2013 | Grebus ................ H04L 63/164 |
| | | | 713/153 |
| 8,924,523 | B1 | 12/2014 | Dickie |
| 8,930,462 | B1 | 1/2015 | Banerjee |
| 9,003,474 | B1 * | 4/2015 | Smith .................... G06F 16/00 |
| | | | 726/1 |
| 9,613,190 | B2 * | 4/2017 | Ford ...................... G06F 21/10 |
| 10,049,223 | B1 * | 8/2018 | Bray ...................... G06F 21/62 |
| 2006/0190742 | A1 | 8/2006 | Ebitani et al. |
| 2008/0209329 | A1 | 8/2008 | Defranco et al. |
| 2011/0113071 | A1 | 5/2011 | Lee et al. |
| 2013/0103771 | A1 | 4/2013 | Lv |
| 2014/0122416 | A1 | 5/2014 | Leto et al. |
| 2014/0280079 | A1 | 9/2014 | Jain et al. |
| 2014/0280134 | A1 | 9/2014 | Horen et al. |

FOREIGN PATENT DOCUMENTS

| | | |
|---|---|---|
| CN | 102833277 | 12/2012 |
| CN | 103401923 | 11/2013 |
| CN | 103761327 | 4/2014 |
| CN | 104463515 | 3/2015 |
| CN | 104580364 | 4/2015 |
| EP | 2093933 | 8/2009 |
| JP | 2006126966 | 5/2006 |
| JP | 2006260521 | 9/2006 |
| JP | 2007080050 | 3/2007 |
| JP | 2007328643 | 12/2007 |
| JP | 2014130596 | 7/2014 |
| WO | WO 2009125571 | 10/2009 |
| WO | WO 2014138747 | 12/2014 |

OTHER PUBLICATIONS

European Search Report in European Application No. 16799185.0, dated Oct. 16, 2018, 16 pages.
Waters, "QR Codes for Dummies," John Wiley & Sons, May 2012, pp. 48-56.
European Extended Search Report in European Patent Application No. 16799185.0, dated Feb. 25, 2019, 15 pages.
Katz et al., "Introduction to Modem Cryptography: Chapter 1 Introduction; Chapter 10 Key Management," Chapman and Hall/CRC, Nov. 2014, 18 pages.
YouTube [online]. How to Support "How to share a Link to your Photo Album with Friends & Family on Google™ Plus," Jul. 2013, [retrieved on Feb. 6, 2019], retrieved from: URL<https://www.youtube.com/watch?v=3v32iuPz2ac>, 5 pages.
International Search Report by the International Searching Authority issued in International Application No. PCT/CN2016/080439 dated Jul. 21, 2016; 9 pages.
Crosby et al., "BlockChain Technology: Beyond Bitcoin," Sutardja Center for Entrepreneurship & Technology Technica Report, Oct. 16, 2015, 35 pages.
Nakamoto, "Bitcoin: A Peer-to-Peer Electronic Cash System," www.bitcoin.org, 2005, 9 pages.
[No Author], "Gramographical Paintings. Products A, monthly automatic recognition," Japan, Japanese Industrial Publishing Co., Ltd., Dec. 10, 2011, 24(13):39-43.
Office Action in Japanese Patent Application No. 2017-561932, dated Mar. 17, 2020, 14 pages (with Machine Translation).

* cited by examiner

SECURELY AND EFFICIENTLY SHARING DATA EXCHANGE RECORDS

This application is a continuation of PCT Application No. PCT/CN2016/080439, filed on Apr. 28, 2016, which claims priority to Chinese Patent Application No. 201510284669.2, filed on May 28, 2015, the entire contents of each are hereby incorporated by reference.

BACKGROUND

In data exchange between two parties, if either party wants to obtain a data exchange record of the data exchange, it may directly log in to the user account of a third-party data exchange platform that handles the data exchange. A fourth party not participating in the data exchange is normally unable to obtain the data exchange record from the third-party platform. Instead, it may obtain the data exchange record indirectly from the two parties participating in the data exchange.

SUMMARY

The present disclosure describes securely and efficiently sharing data exchange records.

In an implementation, a data exchange is stored between two parties as one or more data exchange records. A data exchange record locator for locating the one or more data exchange records is generated. The data exchange record locator is sent to at least one of the two parties. A request is received for at least one of the one or more data exchange records from a non-party not participating in the data exchange. The at least one of the one or more data exchange records is sent to the non-party.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to allow an authorized non-party not participating in a data exchange to easily and securely retrieve a record of the data exchange. Because the data exchange record does not need to be forwarded to the non-party by one of the parties participating in the data exchange, the possibility of data leaks is reduced. For example, using a Quick Response (QR) code or Uniform Resource Locator (URL), the background system can assign a role authorization, where only participants have permission to login/access data. Also, participants assigned to different roles can be permitted to access only information corresponding to their assigned roles.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes methods and systems, including computer-implemented methods, computer program products, and computer systems for securely and efficiently sharing data exchange records, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In data exchange between two parties, if either party wants to obtain a data exchange record of the data exchange, it may directly log in to the user account of a third-party data exchange platform that handles the data exchange. A fourth party not participating in the data exchange is normally unable to obtain the data exchange record from the third-party platform. Instead, it may obtain the data exchange record indirectly from the two parties participating in the data exchange.

The present disclosure describes an efficient and secure method for the third-party data exchange platforms, or the two parties participating in the data exchange, to share the data exchange record to a non-party not participating in the data exchange. The third-party data exchange platform can generate a data exchange record locator that can be shared by the third-party data exchange platform or one of the two parties participating in the data exchange with the non-party. The non-party can use the data exchange record locator to retrieve the data exchange record. As such, a party participating in the data exchange does not need to forward the data exchange record to the non-party. The risk of data exchange record leaking can be reduced.

Figure 1:
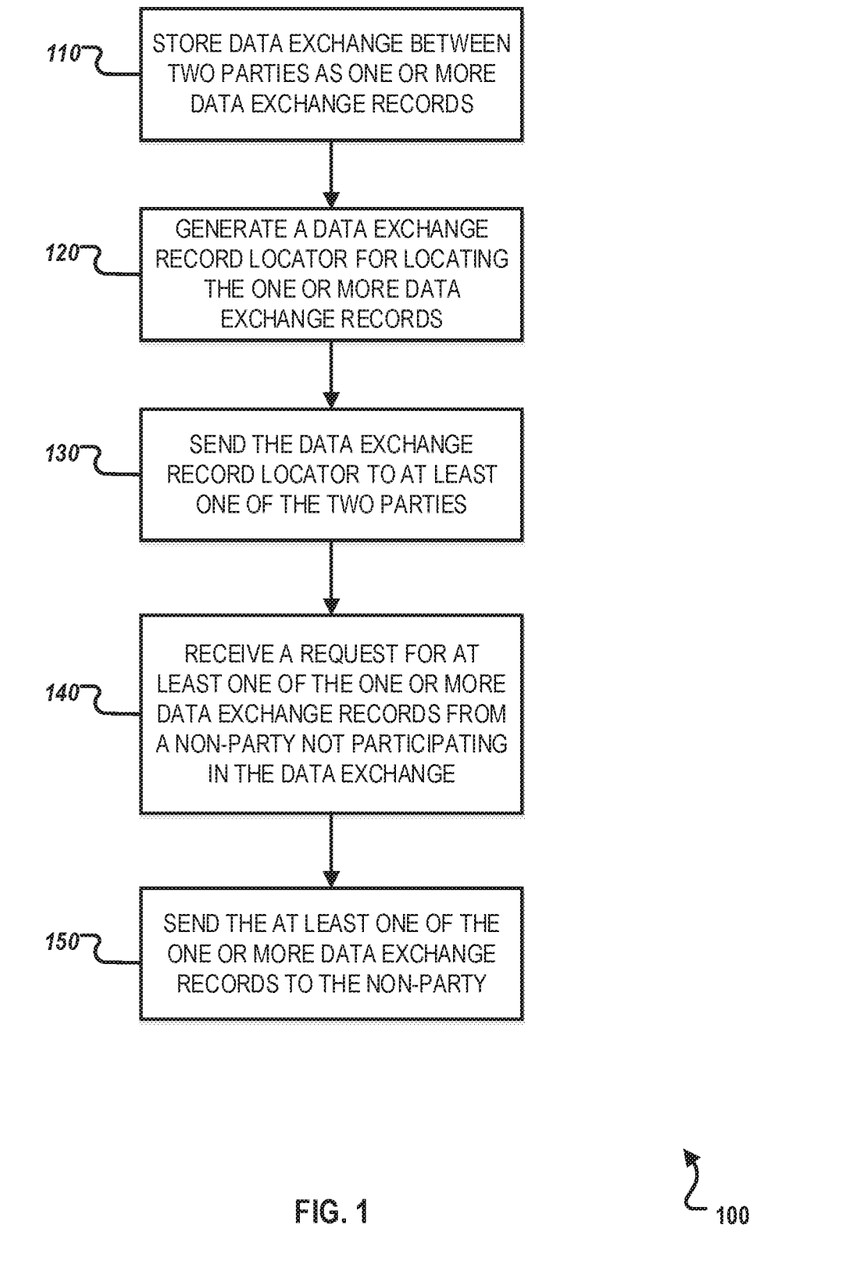
FIG. 1 is a flowchart illustrating an example of a method for sharing a data exchange record to a party not participating in the data exchange, according to an implementation of the present disclosure.

FIG. 1 is a flowchart illustrating an example of a method 100 for sharing a data exchange record to a party not participating in the data exchange, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

The method 100 can be performed by a third-party data exchange platform that handles the data exchange between two parties. The third-party data exchange platform can implement the method 100 to allow the data exchange information it recorded (aka, data exchange record) to be securely and efficiently shared to a non-party to the data exchange. The non-party to the data exchange was not participating in the data exchange or did not contribute to the data exchange record. For example, in online interviews, a number of interviewers can interview an interviewee through an online video conference platform. The online video conference platform is a third-party data exchange platform that can record the interview. The recorded interview includes the data exchange between two parties, the interviewers and interviewee. A human resource manager who requests to review the interview can be a non-party to the data exchange. As another example, in online shopping, a buyer can place an online order of a gift to her friend through an online shopping platform such as AMAZON, EBAY, or TAOBAO. The online shopping platform is the third-party data exchange platform. Information related to the transaction between the buyer and seller is the data exchange record. The friend can be a non-party to the data exchange who queries the data exchange record for information such as order or shipment status.

At 110, data exchange between two parties is stored as one or more data exchange records. The data exchange can be recorded by a third-party data exchange platform. The one or more data exchange records (for example, the recorded interview or transaction information) can include user information of the two parties who performed the data exchange, data content, and data exchange status. The user information can be account information of the users at the third-party data exchange platform. Data content can be the actual data exchanged between the two parties. For example, the data content can be transaction amount, quantity, and item gifted in the online shopping example. Data exchange status can include order status, shipment status, or other status reflecting the data exchange progress of the two parties. From 110, method 100 proceeds to 120.

At 120, a data exchange record locator for locating the one or more data exchange records is generated. The data exchange record locator is associated with the one or more data exchange records and can be used for locating the one or more data exchange records. In some implementations, the data exchange record locator can be a link directed to the one or more data exchange records. In the online shopping example, a link to user account information, order information, or shipment information can be a data exchange record locator.

In some implementations, the data exchange record locator can be a matrix-type barcode (such as, a quick response (QR) code) associated with a link directed to the one or more data exchange records. Where the matrix-type barcode is a QR code, the QR code can be scanned to retrieve the associated link to locate the one or more data exchange records. In some implementations, the data exchange record locator (QR code) can be associated with a character string or an index item. The character string or index item can have an association (such as, a one-to-one association) with a link directed to the one or more data exchange records. In some implementations, the association (such as, a mapping index) can be stored on a server of the third-party data exchange platform. When a QR code is scanned, the character string or index item can be retrieved. A request including the character string or index item can be sent to the server to determine the link to the one or more data exchange records based on the association. From 120, method 100 proceeds to 130.

At 130, the data exchange record locator is sent to at least one of the two parties. In the online shopping example, the one or more data exchange records can include order information. A link or a QR code to retrieve the order information can be sent to at least one of the buyer or the seller. If the buyer ordered a gift for a friend, instead of providing the order information to the friend, the buyer can send the link or QR code to the friend for the friend to retrieve the order information from the third-party data exchange platform.

In some implementations, a virtual button can be presented on a user interface of a user's computing device. The user can copy the link by clicking the virtual button and share the link with a friend. In some cases, a QR code can be presented on the user interface and an option to scan the QR code to retrieve a link directed to the one or more data exchange records, or to share the QR code, can be provided to the user.

In some implementations, the third-party data exchange platform can obtain the contact information of a non-party and send the data exchange record locator to the non-party based on the contact information. As such, the non-party can directly retrieve the data exchange record from the third-party data exchange platform instead of one of the two parties participating in the data exchange. The process of sharing data exchange record to a non-party can then be automated. As an example, in the online shopping example, the non-party can be the gift recipient. The contact information such as email address, phone number, or social media account may be included in the recipient information for delivering the gift. The third-party data exchange platform can send the data exchange record locator to the non-party based on the contact information. In some cases, if the data exchange record locator is a QR code, the third-party data exchange platform can send a link directed to the QR code to the non-party, based on the contact information. Alternatively or additionally, the third-party data exchange platform can prompt the buyer to enter the contact information of the recipient, if the recipient is different from the buyer or if the buyer selected a gift option associated with the item. The third-party data exchange platform can then send the data exchange record locator to the recipient based on the contact information entered by the buyer. From 130, method 100 proceeds to 140.

At 140, a request for at least one of the one or more data exchange records from a non-party not participating in the data exchange is received. In the online shopping example, the friend recipient of the gift is a non-party to the data exchange. The non-party can send the request by opening the data exchange record locator (for example, clicking the link or scanning the QR code) sent from the at least one of the two parties. If the data exchange record locator is a link, the non-party recipient can open the link in a web browser or an application and send the request through the web browser or the application, for the data exchange record it wants to review. If the QR code is associated with a link to the data exchange record, the non-party recipient of the QR code can scan the QR code using a corresponding mobile application to retrieve and open the link. Similarly, if the QR code is associated with a character string, the character string can be mapped to a link directed to the data exchange record. After opening the link, the non-party can request the data exchange record it wants to review. The request sent by the non-party can include a data exchange record identifier identifying the data exchange record. In some cases, the data exchange record locator is directed to one data exchange record, the data exchange record identifier can be the same as the data exchange record locator.

In the online shopping example, the data exchange record locator can be a link directed to the one or more data exchange records. The one or more data exchange records can include information of the buyer or the seller, order information, item description, and shipment status. By opening the data exchange record locator, the non-party gift recipient can have an option to select one or more data exchange records to review. By making the selection, a request, including the data exchange record identifier, can be sent to the third-party data exchange platform. The data exchange record identifier can be an order number if the data exchange record requested is the order information or order status. From 140, method 100 proceeds to 150.

At 150, the at least one of the one or more data exchange records are sent to the non-party to the data exchange in response to the request. As described earlier, the data exchange record locator is directed to one or more data exchange records. Each data exchange record is associated with a data exchange record identifier. The non-party can send a request to the third-party data exchange platform by selecting the data exchange record it wants to review. The request can include the data exchange record identifier that the third-party data exchange platform can use to retrieve the data exchange record and send the record to the non-party.

In some implementations, the data exchange record locator can be encrypted before sending to the at least one of the two parties to improve data security. In some cases, the third-party data exchange platform can use a predetermined algorithm to encrypt the data exchange record locator. For example, assume that the data exchange record locator is a link of the following address: "http://aaa.bbb.cc.dd/xxxxxx," where "xxxxxx" is a data exchange record identifier for identifying a data exchange record. In the online shopping example, the identifier can be an order number. A corresponding data exchange record can be the order information. An example predetermined algorithm for encrypting the data exchange record locator can replace "aaa" with "eee" and "ff" with "dd." The decryption can be an inverse process of the encryption. After the third-party data exchange platform receives the request from the non-party, it can use the predetermined algorithm to decrypt the data exchange record locator, to retrieve the data exchange record identifier. For example, if the received request includes an encrypted data exchange record locator "http://eee.bbb.ff.dd/xxxxxx," the third-party data exchange platform can refer to the predetermined algorithm and replace "eee" with "aaa," and "ff" with "cc."

In some cases, the data exchange record locator can be encrypted (for example, using key encryption). In such cases, the data exchange record locator can be encrypted and sent to the at least one of the two parties with an encryption key. Key encryption of the data exchange record locator can be based on algorithms such as symmetric encryption or asymmetric encryption. If a symmetric encryption algorithm is used, the same key is used for both encryption and decryption. The key is sent to the at least one of the two parties with the symmetrically encrypted data exchange record locator. At least one of the two parties can forward the symmetrically encrypted data exchange record locator and the key to the non-party recipient. The non-party recipient can input the key to decrypt the data exchange record locator.

If asymmetric encryption is used, a pair of encryption key and decryption key can be generated. The encryption key does not need to be sent to the at least one of the two parties. Only the decryption key need to be sent with the encrypted data exchange record locator. The at least one of the two parties can forward the asymmetrically encrypted data exchange record locator and the decryption key to the non-party recipient. In some cases, the key may be sent to the at least one of the two parties in a different manner than the encrypted data exchange record locator. For example, the encrypted data exchange record locator can be sent as a web link, while the key can be sent in text message or email.

In some implementations, after the receiving the encrypted data exchange record locator and the key, the non-party can click or scan the encrypted data exchange record locator to send a request for retrieving the data exchange record from the third-party data exchange platform. The third-party data exchange platform that receives the request can display an input field to the non-party for inputting the key. After the non-party inputs the key and confirms the input, the third-party data exchange platform (or a server of the third-party data exchange platform designated for managing the data exchange record) can decrypt the encrypted exchange record using the key.

In some implementations, the third-party data exchange platform can send an encrypted data exchange record locator to the non-party based on the non-party's contact information instead of sending the data exchange record locator to the at least one of the two parties, as described in step 130 of the example method 100. If key encryption is used to encrypt the data exchange record locator, then the third-party data exchange platform can send the decryption key along with the encrypted data exchange record locator to the non-party. If symmetric key encryption is used, the decryption is the same as the encryption key. After 150, method 100 stops.

Using the implementations of method 100 described in FIG. 1, an authorized non-party not participating in the data exchange can easily and securely retrieve a record of the data exchange. The data exchange record does not need to be transmitted by one of the parties participating in the data exchange. Encrypting the data exchange record locator can further enhance security and prevent the data exchange record from leaking during unsecured transmission.

Figure 2:
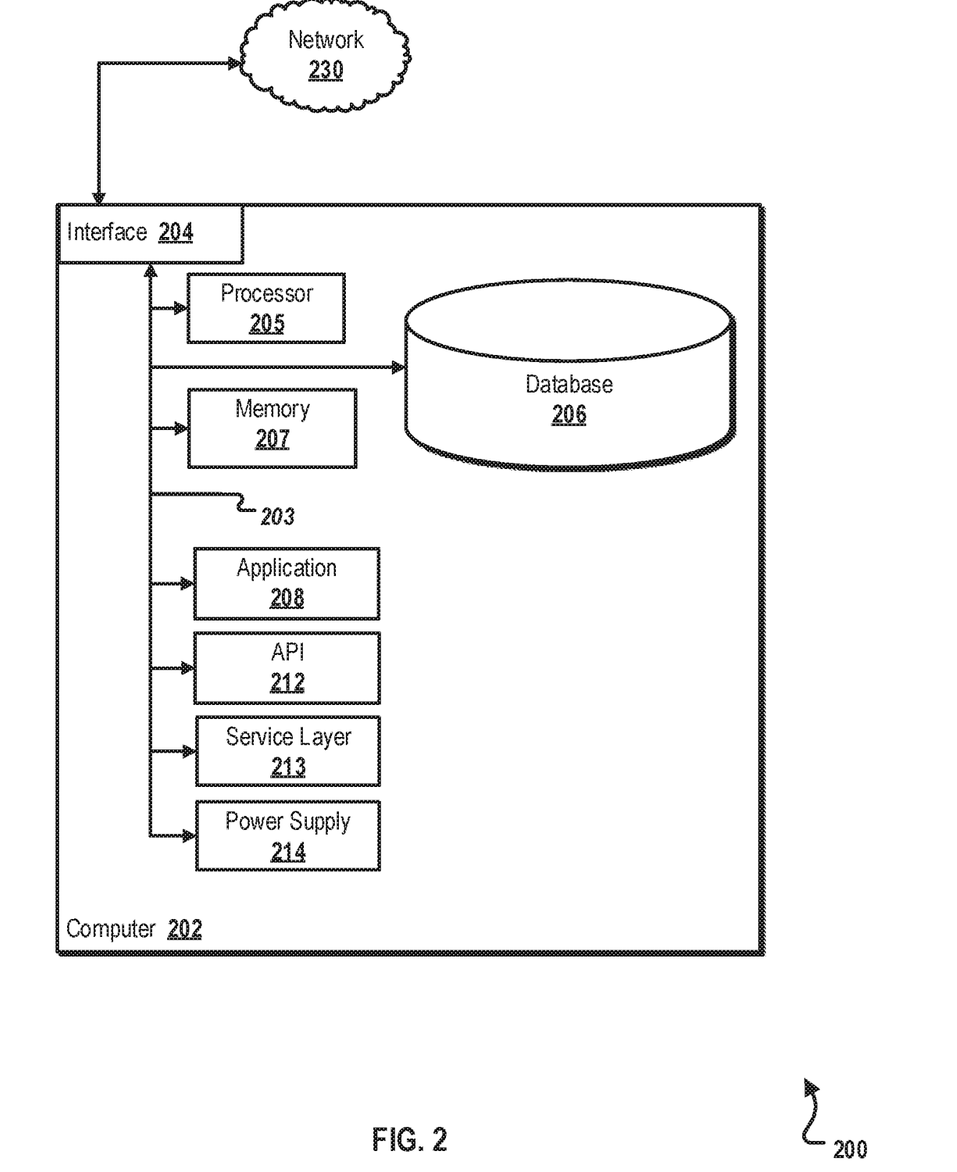
FIG. 2 is a block diagram illustrating an example of a computer-implemented System used to provide computational functionalities associated with described algorithms, methods, functions, processes, flows, and procedures, according to an implementation of the present disclosure.

FIG. 2 is a block diagram illustrating an example of a computer-implemented System 200 used to provide computational functionalities associated with described algorithms, methods, functions, processes, flows, and procedures, according to an implementation of the present disclosure. In the illustrated implementation, System 200 includes a Computer 202 and a Network 230.

The illustrated Computer 202 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 202 can include an input device, such as a keypad, keyboard, touch screen, another input device, or a combination of input devices that can accept user information, and an output device that conveys information associated with the operation of the Computer 202, including digital data, visual, audio, another type of information, or a combination of types of information, on a graphical-type user interface (UI) (or GUI) or other UI.

The Computer 202 can serve in a role in a distributed computing system as a client, network component, a server, a database or another persistency, another role, or a combination of roles for performing the subject matter described in the present disclosure. The illustrated Computer 202 is communicably coupled with a Network 230. In some implementations, one or more components of the Computer 202 can be configured to operate within an environment, including cloud-computing-based, local, global, another environment, or a combination of environments.

At a high level, the Computer 202 is an electronic computing device operable to receive, transmit, process, store, or manage data and information associated with the described subject matter. According to some implementations, the Computer 202 can also include or be communicably coupled with a server, including an application server, e-mail server, web server, caching server, streaming data server, another server, or a combination of servers.

The Computer 202 can receive requests over Network 230 (for example, from a client software application executing on another Computer 202) and respond to the received requests by processing the received requests using a software application or a combination of software applications. In addition, requests can also be sent to the Computer 202 from internal users (for example, from a command console or by another internal access method), external or third-parties, or other entities, individuals, systems, or computers.

Each of the components of the Computer 202 can communicate using a System Bus 203. In some implementations, any or all of the components of the Computer 202, including hardware, software, or a combination of hardware and software, can interface over the System Bus 203 using an application programming interface (API) 212, a Service Layer 213, or a combination of the API 212 and Service Layer 213. The API 212 can include specifications for routines, data structures, and object classes. The API 212 can be either computer-language independent or dependent and refer to a complete interface, a single function, or even a set of APIs. The Service Layer 213 provides software services to the Computer 202 or other components (whether illustrated or not) that are communicably coupled to the Computer 202. The functionality of the Computer 202 can be accessible for all service consumers using the Service Layer 213. Software services, such as those provided by the Service Layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 202, alternative implementations can illustrate the API 212 or the Service Layer 213 as stand-alone components in relation to other components of the Computer 202 or other components (whether illustrated or not) that are communicably coupled to the Computer 202. Moreover, any or all parts of the API 212 or the Service Layer 213 can be implemented as a child or a sub-module of another software module, enterprise application, or hardware module without departing from the scope of the present disclosure.

The Computer 202 includes an Interface 204. Although illustrated as a single Interface 204, two or more Interfaces 204 can be used according to particular needs, desires, or particular implementations of the Computer 202. The Interface 204 is used by the Computer 202 for communicating with another computing system (whether illustrated or not) that is communicatively linked to the Network 230 in a distributed environment. Generally, the Interface 204 is operable to communicate with the Network 230 and includes logic encoded in software, hardware, or a combination of software and hardware. More specifically, the Interface 204 can include software supporting one or more communication protocols associated with communications such that the Network 230 or hardware of Interface 204 is operable to communicate physical signals within and outside of the illustrated Computer 202.

The Computer 202 includes a Processor 205. Although illustrated as a single Processor 205, two or more Processors 205 can be used according to particular needs, desires, or particular implementations of the Computer 202. Generally, the Processor 205 executes instructions and manipulates data to perform the operations of the Computer 202 and any algorithms, methods, functions, processes, flows, and procedures as described in the present disclosure.

The Computer 202 also includes a Database 206 that can hold data for the Computer 202, another component communicatively linked to the Network 230 (whether illustrated or not), or a combination of the Computer 202 and another component. For example, Database 206 can be an in-memory, conventional, or another type of database storing data consistent with the present disclosure. In some implementations, Database 206 can be a combination of two or more different database types (for example, a hybrid in-memory and conventional database) according to particular needs, desires, or particular implementations of the Computer 202 and the described functionality. Although illustrated as a single Database 206, two or more databases of similar or differing types can be used according to particular needs, desires, or particular implementations of the Computer 202 and the described functionality. While Database 206 is illustrated as an integral component of the Computer 202, in alternative implementations, Database 206 can be external to the Computer 202.

The Computer 202 also includes a Memory 207 that can hold data for the Computer 202, another component or components communicatively linked to the Network 230 (whether illustrated or not), or a combination of the Computer 202 and another component. Memory 207 can store any data consistent with the present disclosure. In some implementations, Memory 207 can be a combination of two or more different types of memory (for example, a combination of semiconductor and magnetic storage) according to particular needs, desires, or particular implementations of the Computer 202 and the described functionality. Although illustrated as a single Memory 207, two or more Memories 207 or similar or differing types can be used according to particular needs, desires, or particular implementations of the Computer 202 and the described functionality. While Memory 207 is illustrated as an integral component of the Computer 202, in alternative implementations, Memory 207 can be external to the Computer 202.

The Application 208 is an algorithmic software engine providing functionality according to particular needs, desires, or particular implementations of the Computer 202, particularly with respect to functionality described in the present disclosure. For example, Application 208 can serve as one or more components, modules, or applications. Further, although illustrated as a single Application 208, the Application 208 can be implemented as multiple Applications 208 on the Computer 202. In addition, although illustrated as integral to the Computer 202, in alternative implementations, the Application 208 can be external to the Computer 202.

The Computer 202 can also include a Power Supply 214. The Power Supply 214 can include a rechargeable or non-rechargeable battery that can be configured to be either user- or non-user-replaceable. In some implementations, the Power Supply 214 can include power-conversion or management circuits (including recharging, standby, or another power management functionality). In some implementations, the Power Supply 214 can include a power plug to allow the Computer 202 to be plugged into a wall socket or another power source to, for example, power the Computer 202 or recharge a rechargeable battery.

There can be any number of Computers 202 associated with, or external to, a computer system containing Computer 202, each Computer 202 communicating over Network 230. Further, the term "client," "user," or other appropriate terminology can be used interchangeably, as appropriate, without departing from the scope of the present disclosure. Moreover, the present disclosure contemplates that many users can use one Computer 202, or that one user can use multiple computers 202.

Described implementations of the subject matter can include one or more features, alone or in combination.

For example, in a first implementation, a computer-implemented method, comprising: storing data exchange between two parties as one or more data exchange records; generating a data exchange record locator for locating the one or more data exchange records; sending the data exchange record locator to at least one of the two parties; receiving a request for at least one of the one or more data exchange records from a non-party not participating in the data exchange; and sending the at least one of the one or more data exchange records to the non-party.

The foregoing and other described implementations can each, optionally, include one or more of the following features:

A first feature, combinable with any of the following features, wherein the data exchange record locator is a link directed to the one or more data exchange records or a quick response (QR) code associated with the link.

A second feature, combinable with any of the previous or following features, further comprising sending the data exchange record locator to the non-party.

A third feature, combinable with any of the previous or following features, wherein the received request includes at least one data exchange record identifier corresponding to the at least one of the one or more data exchange records.

A fourth feature, combinable with any of the previous or following features, wherein the data exchange record locator is encrypted using key encryption and the method further comprises sending a decryption key to the at least one of the two parties for decrypting the encrypted data exchange record locator.

A fifth feature, combinable with any of the previous or following features, wherein the data exchange record locator is encrypted and the received request includes the encrypted data exchange record locator, and the method further comprises: decrypting the data exchange record locator in response to the request; and identifying the at least one of the one or more data exchange records based on the decrypted data exchange record locator.

A sixth feature, combinable with any of the previous or following features, wherein the request is generated based on the data exchange record locator sent by the at least one of the two parties.

In a second implementation, a non-transitory, computer-readable medium storing one or more instructions executable by a computer system to perform operations comprising: storing data exchange between two parties as one or more data exchange records; generating a data exchange record locator for locating the one or more data exchange records; sending the data exchange record locator to at least one of the two parties; receiving a request for at least one of the one or more data exchange records from a non-party not participating in the data exchange; and sending the at least one of the one or more data exchange records to the non-party.

The foregoing and other described implementations can each, optionally, include one or more of the following features:

A first feature, combinable with any of the following features, wherein the data exchange record locator is a link directed to the one or more data exchange records or a quick response (QR) code associated with the link.

A second feature, combinable with any of the previous or following features, further comprising one or more instructions to send the data exchange record locator to the non-party.

A third feature, combinable with any of the previous or following features, wherein the received request includes at least one data exchange record identifier corresponding to the at least one of the one or more data exchange records.

A fourth feature, combinable with any of the previous or following features, wherein the data exchange record locator is encrypted using key encryption and the method further comprises sending a decryption key to the at least one of the two parties for decrypting the encrypted data exchange record locator.

A fifth feature, combinable with any of the previous or following features, wherein the data exchange record locator is encrypted and the received request includes the encrypted data exchange record locator, and the method further comprises one or more instructions to: decrypt the data exchange record locator in response to the request; and identify the at least one of the one or more data exchange records based on the decrypted data exchange record locator.

A sixth feature, combinable with any of the previous or following features, wherein the request is generated based on the data exchange record locator sent by the at least one of the two parties.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: storing data exchange between two parties as one or more data exchange records; generating a data exchange record locator for locating the one or more data exchange records; sending the data exchange record locator to at least one of the two parties; receiving a request for at least one of the one or more data exchange records from a non-party not participating in the data exchange; and sending the at least one of the one or more data exchange records to the non-party.

The foregoing and other described implementations can each, optionally, include one or more of the following features:

A first feature, combinable with any of the following features, wherein the data exchange record locator is a link directed to the one or more data exchange records or a quick response (QR) code associated with the link.

A second feature, combinable with any of the previous or following features, further comprising one or more instructions to send the data exchange record locator to the nonparty.

A third feature, combinable with any of the previous or following features, wherein the received request includes at least one data exchange record identifier corresponding to the at least one of the one or more data exchange records.

A fourth feature, combinable with any of the previous or following features, wherein the data exchange record locator is encrypted using key encryption and the method further comprises sending a decryption key to the at least one of the two parties for decrypting the encrypted data exchange record locator.

A fifth feature, combinable with any of the previous or following features, wherein the data exchange record locator is encrypted and the received request includes the encrypted data exchange record locator, and the method further comprises one or more instructions to: decrypt the data exchange record locator in response to the request; and identify the at least one of the one or more data exchange records based on the decrypted data exchange record locator.

A sixth feature, combinable with any of the previous or following features, wherein the request is generated based on the data exchange record locator sent by the at least one of the two parties.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    managing a data exchange, by a data exchange platform, between a first party and a second party;
    storing, by the data exchange platform, one or more data exchange records generated from the data exchange;
    generating, by the data exchange platform, an encrypted data exchange record locator for locating the one or more data exchange records, wherein the encrypted data exchange record locator is encrypted using an encryption key;
    sending, by the data exchange platform, the encrypted data exchange record locator and a decryption key to a third-party not participating in the data exchange, wherein the decryption key corresponds to the encryption key;
    receiving, by the data exchange platform and from the third-party, a request for at least one of the one or more data exchange records, wherein the request is based on a decrypted data exchange record locator using the decryption key; and
    sending, by the data exchange platform, the at least one of the one or more data exchange records to the third-party.

2. The computer-implemented method of claim 1, wherein the encrypted data exchange record locator is a link directed to the one or more data exchange records or a quick response (QR) code associated with the link.

3. The computer-implemented method of claim 1, wherein the received request includes at least one data exchange record identifier corresponding to the at least one of the one or more data exchange records.

4. The computer-implemented method of claim 1, wherein the encrypted data exchange record locator is encrypted by applying a predetermined algorithm to a data exchange record locator for locating the one or more data exchange records, and the decrypted data exchange record locator is decrypted by applying an inverse operation of the predetermined algorithm to the encrypted data exchange record locator.

5. The computer-implemented method of claim 1, wherein the key is sent in a second sending manner different from the first sending manner of sending the encrypted data exchange record locator.

6. The computer-implemented method of claim 1, wherein sending, by the data exchange platform, the encrypted data exchange record locator and a decryption key to a third-party not participating in the data exchange comprises:
    acquiring contact information of the third-party; and
    sending the encrypted data exchange record locator to the third-party based on the acquired contact information of the third-party.

7. A non-transitory, computer-readable medium storing one or more instructions executable by a computer system to perform operations comprising:
    managing a data exchange, by a data exchange platform, between a first party and a second party;
    storing, by the data exchange platform, one or more data exchange records generated from the data exchange;
    generating, by the data exchange platform, an encrypted data exchange record locator for locating the one or more data exchange records, wherein the encrypted data exchange record locator is encrypted using an encryption key;
    sending, by the data exchange platform, the encrypted data exchange record locator and a decryption key to a third-party not participating in the data exchange, wherein the decryption key corresponds to the encryption key;
    receiving, by the data exchange platform and from the third-party, a request for at least one of the one or more data exchange records, wherein the request is based on a decrypted data exchange record locator using the decryption key; and
    sending, by the data exchange platform, the at least one of the one or more data exchange records to the third-party.

8. The non-transitory, computer-readable medium of claim 7, wherein the encrypted data exchange record locator is a link directed to the one or more data exchange records or a quick response (QR) code associated with the link.

9. The non-transitory, computer-readable medium of claim 7, wherein the received request includes at least one data exchange record identifier corresponding to the at least one of the one or more data exchange records.

10. The non-transitory, computer-readable medium of claim 7, wherein the encrypted data exchange record locator is encrypted by applying a predetermined algorithm to a data exchange record locator for locating the one or more data exchange records, and the decrypted data exchange record locator is decrypted by applying an inverse operation of the predetermined algorithm to the encrypted data exchange record locator.

11. The non-transitory, computer-readable medium of claim 7, wherein the key is sent in a second sending manner different from the first sending manner of sending the encrypted data exchange record locator.

12. The non-transitory, computer-readable medium of claim 7, wherein sending, by the data exchange platform, the encrypted data exchange record locator and a decryption key to a third-party not participating in the data exchange comprises:
acquiring contact information of the third-party; and
sending the encrypted data exchange record locator to the third-party based on the acquired contact information of the third-party.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
managing a data exchange, by a data exchange platform, between a first party and a second party;
storing, by the data exchange platform, one or more data exchange records generated from the data exchange;
generating, by the data exchange platform, an encrypted data exchange record locator for locating the one or more data exchange records, wherein the encrypted data exchange record locator is encrypted using an encryption key;
sending, by the data exchange platform, the encrypted data exchange record locator and a decryption key to a third-party not participating in the data exchange, wherein the decryption key corresponds to the encryption key;
receiving, by the data exchange platform and from the third-party, a request for at least one of the one or more data exchange records, wherein the request is based on a decrypted data exchange record locator using the decryption key; and
sending, by the data exchange platform, the at least one of the one or more data exchange records to the third-party.

14. The computer-implemented system of claim 13, wherein the encrypted data exchange record locator is a link directed to the one or more data exchange records or a quick response (QR) code associated with the link.

15. The computer-implemented system of claim 13, wherein the received request includes at least one data exchange record identifier corresponding to the at least one of the one or more data exchange records and is generated based on the data exchange record locator sent by the at least one of the two parties.

16. The computer-implemented system of claim 13, wherein the encrypted data exchange record locator is encrypted by applying a predetermined algorithm to a data exchange record locator for locating the one or more data exchange records, and the decrypted data exchange record locator is decrypted by applying an inverse operation of the predetermined algorithm to the encrypted data exchange record locator.

17. The computer-implemented system of claim 13, wherein the key is sent in a second sending manner different from the first sending manner of sending the encrypted data exchange record locator.

* * * * *